Nov. 23, 1965  W. R. FERNELL  3,218,957
HEATING CONTROL

Filed Nov. 1, 1960  4 Sheets-Sheet 1

INVENTOR.
WILLIAM RONALD FERNELL
BY
Brumbaugh, Free, Graves & Donohue
his ATTORNEYS.

INVENTOR.
WILLIAM RONALD FERNELL

INVENTOR.
WILLIAM RONALD FERNELL

United States Patent Office 3,218,957
Patented Nov. 23, 1965

3,218,957
HEATING CONTROL
William Ronald Fernell, Gorleston-on-Sea, England, assignor to Lever Brothers Company, New York, N.Y., a corporation of Maine
Filed Nov. 1, 1960, Ser. No. 66,614
Claims priority, application Great Britain, Nov. 2, 1959, 37,172/59
2 Claims. (Cl. 99—327)

This invention relates to heating and heating control.

The invention is particularly applicable to microwave heating of food where heating times are different for different foodstuffs, but in which a small variation from the correct heating time can spoil the product being heated. In such cases, some embodiments of the present invention can enable a packaged foodstuff to control the heating time automatically.

According to the present invention there is provided an apparatus comprising a heating device for heating an object, a controlling means for controlling the heating device, and a sensing means responsive to pre-selected features of objects to be heated, the arrangement being such that when an object having one of said pre-selected features is correctly associated with the sensing means, the sensing means can respond to the presence of this pre-selected feature to set the controlling means in accordance with this pre-selected feature to determine the amount of heating the heating device will transmit to the object.

The sensing means can be outside the heating device and a transporting means can be provided for transporting the object into the heating device after the sensing means has responded to the pre-selected feature. The arrangement can be such that the transporting means transports the heated object out of the heating device when the heating device has transmitted to the object said determined amount of heating.

The sensing means can be arranged to respond to the pre-selected feature during the passage of the object to or into the heating device, or when the object is located in position in the heating device.

The controlling means can control the time of heating, the intensity of heating, or both, and in addition may control the switching on and off of the heating device.

The sensing means can have a plurality of movable members each for engaging in a suitably positioned hole in a flange of flap of a container when this container is correctly associated with the sensing means, the sensing means responding when one or more movable members engage any pre-selected hole or combination of holes in said flange or flap.

The present invention also provides an apparatus for heating a food product in a container, said apparatus comprising a microwave oven, a means for controlling the heating of the oven, a sensing means responsive to the presence of a hole or holes suitably positioned in a flange or flap of the container when the container is correctly associated with the sensing means, response of the sensing means pre-setting the controlling means to pre-set the heating time of the product in the oven in accordance with the position of said hole or holes, and a transporting means for transporting the container from association with the sensing means into the oven after the response of the sensing means and then transporting the container out of the oven after the product has been heated for said pre-set time.

A cutting means can be provided for cutting off at least the part of said flange or flap which has said hole or holes therein after the sensing device has responded to the presence of said hole or holes but before the container is transported into the oven.

According to the present invention there is also provided a method of heating an object whereby a sensing means is caused to respond to a pre-selected feature of the object to control the heating by a heating device, the object then being heated by the heating device to an extent dependent upon said pre-selected feature.

The pre-selected feature can be the position of a hole or holes in a flange of flap of the object.

Alternatively, the pre-selected feature can be electric conducting means in or on the object.

The object can be a wrapped or packaged product, for example a food product, in which it is only the product that requires heating. In such cases the wrapping or packaging may not become heated to the same extent as the product, or may even not become heated at all.

The present invention includes a food product packaged in a thermoplastic container which has a flange or flap having therein one or more holes in a pre-determined position or positions, this packaged food product being for use in an apparatus or method as described above.

By way of example, an embodiment of the invention will now be particularly described with reference to the accompanying diagrammatic drawings, in which.

Figure 1:
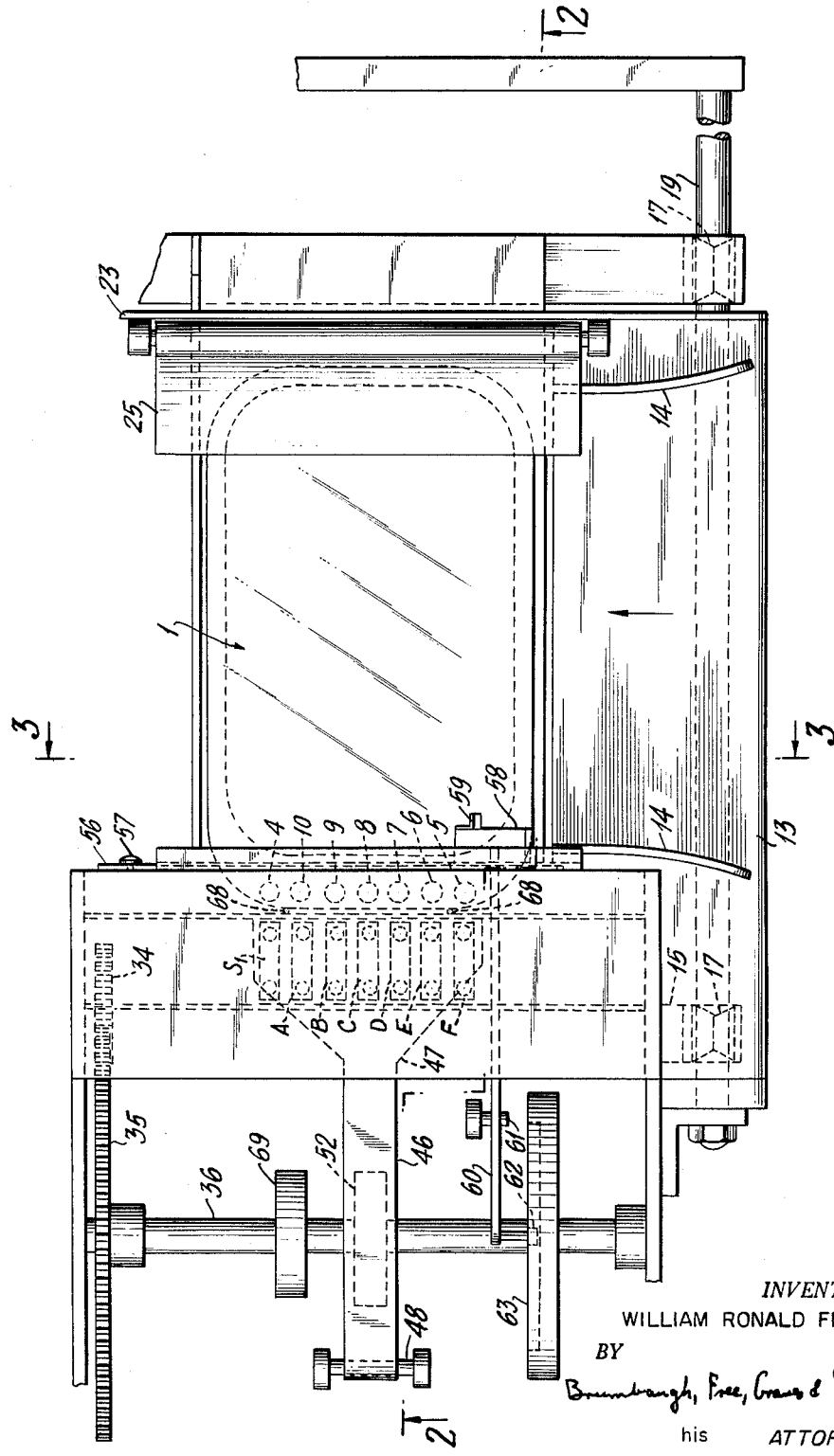
FIGURE 1 is a plan of part of an apparatus according to the invention.
Figure 2:
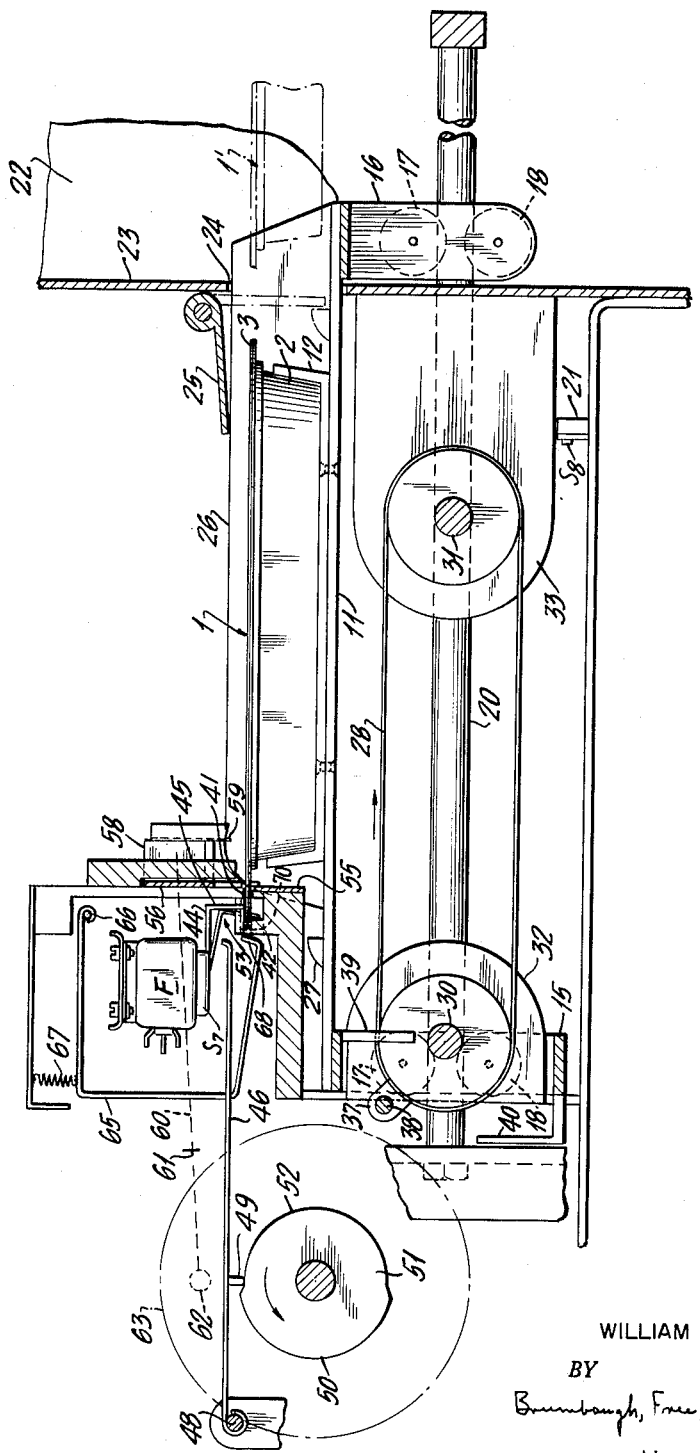
FIGURE 2 is a section on the line II—II in FIGURE 1.
Figure 3:
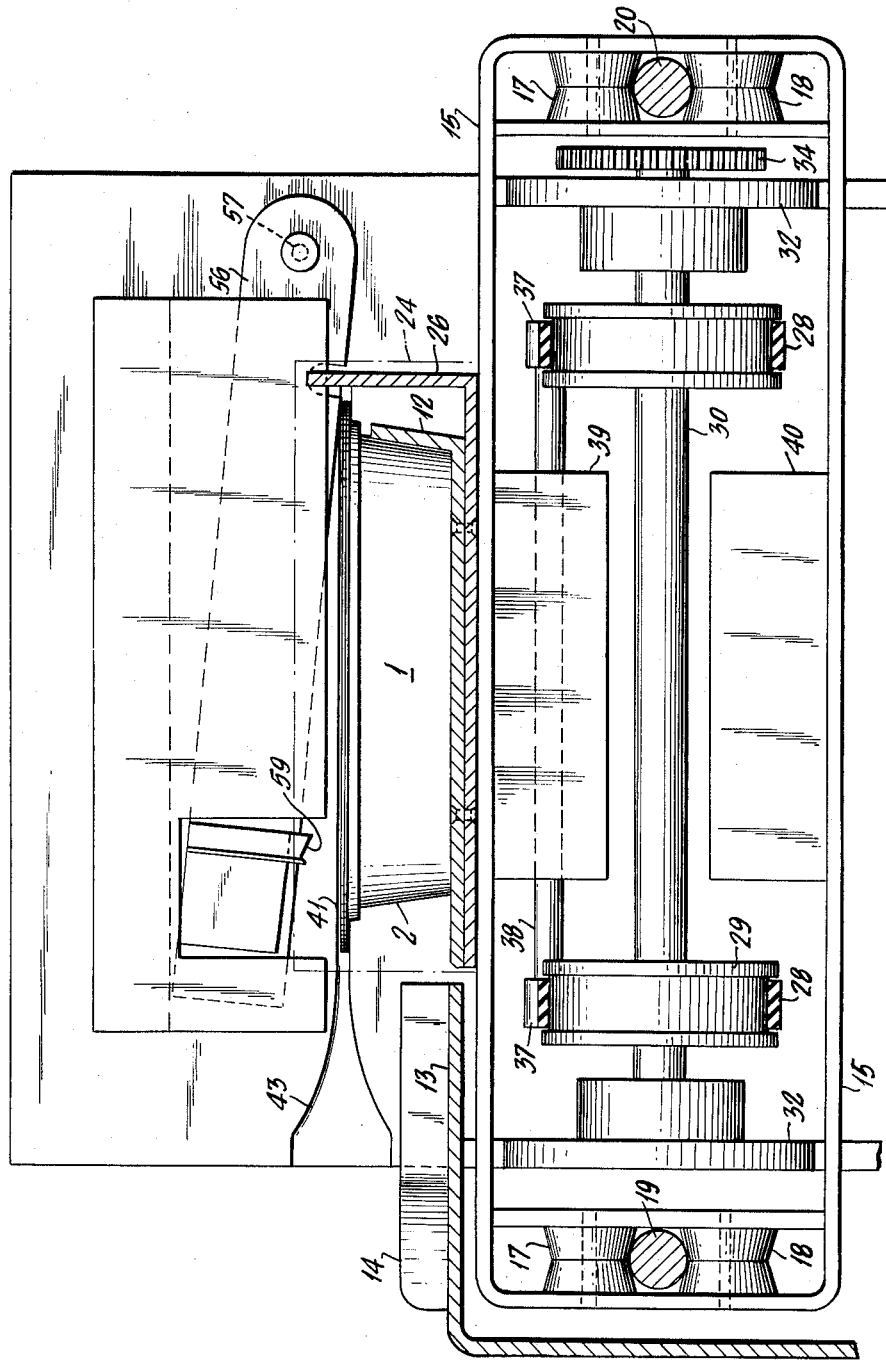
FIGURE 3 is a section on the line III—III in FIGURE 1.

In FIGURES 1 to 3 parts have been omitted to simplify the drawings, only the parts necessary for an understanding of the invention being shown.

The apparatus is intended for use in heating by microwaves the food packaged in a thermoplastic container 1. The container, as shown, is formed by a tray-like receptacle 2 having a sealed on lid 3, a flange constituted by the periphery of the lid and a lip of the receptacle extending right round the container. The part of the flange on the left in FIGURES 1 and 2 is wider and has two holes 4 and 5 therethrough (see FIGURE 1). Instead of the hole 5, there could be a hole in any one of the positions 6, 7, 8, 9, or 10, a pair of holes formed by the combination of 4 with any one of 5 to 10 constituting a pre-selected feature for the containers to be used with this apparatus.

A trolley has a top 11 to which a locating tray 12 is secured by rivets. The tray 12 has three sides and is dimensioned so that the container 1 can be slid into the tray from the left in FIGURE 3 to accurately locate the container on the trolley. To enable the container to be readily slid into the tray 12, the container flange making a substantially straight-line movement into position to be sensed by sensing arms, a platform 13 is provided with side guides 14. Secured to the underside of the trolley top 11 at each end is a frame 15, 16. A pair of rollers 17, 18 are journalled at each side of each frame 15, 16. The two pairs of rollers on the left side of the trolley in FIGURE 3 engage and run on a rod 19 fixed to the frame of the apparatus, and the two pairs of rollers on the other side engage and run on a fixed rod 20. The trolley can move from the position shown in FIGURES 1 and 2 to the right until the lower member of the frame 15 meets a stop 21 carrying a micro-switch $S_8$, the container 1 is then in the position 1' shown in broken lines in FIGURE 2. During this movement the container 1 passes into a microwave oven 22 (see FIGURE 2) only part of one wall 23 of which is shown. This wall 23 has an aperture 24 therethrough which forms the oven entrance; this aperture can be closed by a pivoted door 25. The door 25 is normally held open by a wall 26 along the back edge (right edge in FIGURE 3) of the trolley top 11, as shown in FIGURE 2. The end of the wall 26 to the left in FIGURE 2 is tapered so that the door 25 will close after the container 1 has completely passed through the oven opening 24 but before it has reached the position 1'. A stop 27 then ensures that the door is completely closed (as shown in broken lines in FIGURE 2) when the container reaches the position 1'. The tapered end of the wall 25 automatically opens the door 25 when the trolley is returned to the left. A pair of endless driving belts 28 pass over pulleys 29 which are mounted on shafts 30, 31 which are journalled in supports 32, 33 respectively. The shaft 30 carries a gear wheel 34 (see FIGURE 3) which is driven by a gear wheel 35 (see FIGURE 1) on a cam shaft 36, the gear wheel 35 being driven by a motor M (see FIGURE 4). An arm 37 carried by each belt 28 supports a bar 38. Rotation of the cam shaft 36 anticlockwise in FIGURE 2 moves the belts 28 clockwise, as shown by the arrow, causing the bar 38 to engage a flap 39 dependent from the upper part of the frame 15; further movement of the bar 38 moves the trolley to the right in FIGURE 2 until the container reaches the position 1'. Then, the bar 38 moves out of engagement with the flap 39 as the arms 37 move around the pulleys 29 on the shaft 31. The bar 38 then engages a flap 40 which extends upwardly from the lower member of the frame 15 and the trolley is returned to the position shown in FIGURE 2, the bar 38 disengaging from the flap 40 as the arms 37 pass around the pulleys 29 on the shaft 30. The trolley, tray 12, belts 28 and their associated driving mechanism constitute said transporting means.

When the container 1 is moved between the guides 14 in the direction of the arrow in FIGURE 1 into the tray 12, the part of the flange containing the holes 4 and 5 slides into a groove 41 in a wall 42 of a housing for part of said sensing means. The entrance to the groove 41 is flared as shown at 43 in FIGURE 3; this guides the flange into the groove 41 and enables any deformation of the flange to be corrected. Adjacent the wall 42 are relays A, B, C, D, E, F each having an associated micro-switch $S_2$, $S_3$, $S_4$, $S_5$, $S_6$, $S_7$, respectively, mounted below it. There is also a micro-switch $S_1$. Each micro-switch $S_1$ to $S_7$ has a pivoted actuating arm 44 having a downwardly bent end 45. The arms 44 are normally held horizontally in an out-of-sensing position by a lever 46 having a flared end 47. The lever 46 is pivoted at 48 and is normally held in a raised position against the arms 44 by a cam follower 49 of the lever resting on a high part 50 of a cam 51 mounted on the cam shaft 36. When the cam 51 is rotated anti-clockwise in FIGURE 2 so that the cam follower 49 drops on to the low part 52 of the cam 51, the lever 46 drops to the position shown in FIGURE 2 and the sensing arms 44 are free to pivot downwards along a sensing-arms path. This path forms an angle with the flange path followed by the container flange as the container is moved into position to be sensed by the sensing arms. When the sensing arms 44 have pivoted downwardly, they are in the position 53. However, when the flange of the container 1 is located in the groove 41, the ends 45 of the arms will rest on this flange so that these arms cannot pivot downwards. If, however, a hole in the flange is located below an end 45 of an arm 44, then this end 45 of the selected arm 44 can pass downwards through the hole so that this arm moves to the position 53. The selection of the arm is a function of the position of the hole. When an arm 44 pivots to the position 53, it closes the micro-switch to which it belongs.

A guillotine or cutting means is arranged to cut adjacent to the groove 41. The guillotine has a lower blade 55 fixed to the wall 42 and a movable blade 56 pivoted at 57 to the wall 42. A block 58 carrying a piercing tool 59 is mounted near the end of the blade 56 away from the pivot 57. A lever 60 pivoted at 61 is connected at one end by a ball joint to the block 58. A roller 62 mounted at the other end of the lever 60 runs in a groove in a cam wheel 63 mounted on the cam shaft 36. This cam groove normally keeps the blade 56 in the raised position shown in FIGURES 2 and 3. After the cam shaft has rotated to lower the lever 46 but before the bar 38 engages the flap 39, the cam groove causes the blade 56 to reciprocate about the pivot 57 to cut off from the container 1 the part of the flange in the groove 41 to prevent recycling. During this reciprocation of the blade 56, the piercing tool 59 pierces the lid 3 of the container 1.

Two spaced apart arms 65 are pivoted on a shaft 66 and each arm is held by a spring 67 in the position shown in FIGURE 2. Each arm 65 has a short upturned end 68. Once each revolution of the cam shaft 36, a cam wheel 69 causes the arms 65 to pivot anti-clockwise so that the ends 68 pass through slots 70, indicated in broken lines in FIGURE 2, to eject the cut off part of the flange out of the groove 41. This ejection takes place whilst the high part 50 of the cam 51 is holding the arms 44 in their upper position.

The electrical circuit in FIGURE 4 will now be described. The terminals L, N are for connection to an A.C. mains supply. A resistance $R_1$ is in series with the micro-switch $S_1$ which is connected to the micro-switches $S_2$, $S_3$, $S_4$, $S_5$, $S_6$, $S_7$, each of which is in series with a relay A, B, C, D, E, F, respectively. When the micro-switch $S_1$ is closed and any one of the micro-switches $S_2$ to $S_7$ is also closed, one of the relays A to F is energised so closing the three contacts having the same letter as the energised relay. For example, if $S_1$ and $S_7$ are closed so energising relay F, then contacts $F_1$, $F_2$ and $F_3$ are closed. The closing of any one of the contacts $A_1$ to $F_1$ energising the relay K, the function of which will be described later. The closing of any one of the contacts $A_2$ to $F_2$ lights a lamp $L_2$ to $L_7$ in series therewith. The value of the resistance $R_1$ is chosen so that if more than one of the micro-switches $S_2$ to $S_7$ are closed, then the voltage drop across the corresponding relays is not sufficient to operate any of them. Contacts $G_2$, $G_3$ control the power supply to the microwave oven. The micro-switches $S_1$ to $S_7$, their actuating arms 44, the lever 46, the relays A to F and K, and the contacts these relays actuate comprise said sensing means.

A rectifier Q and neon-filled stabilising tubes $T_1$, $T_2$ supply stabilised D.C. to the rest of the network connected to the right of the tubes $T_1$, $T_2$. Operation of the micro-switch $S_8$ to close the contact $I_1$ and open the contact $I_2$ momentarily energises a relay G whilst a capacitor $U_1$ is charged. This momentary energisation of the relay G closes contacts $G_1$ to hold on the relay G. At the same time the contacts $G_2$, $G_3$, $G_4$ are closed, the contacts $G_5$ are opened, and the mercury contacts $G_6$ are momentarily closed. After the initial actuation of the micro-switch $S_8$ to energise the relay G, further actuation of the micro-switch $S_8$ has no effect whilst the relay G remains energised via the contacts $G_1$ and $H_3$. Closing of the contacts $G_4$ causes a capacitor $U_2$ to be charged in a predetermined time through a timing circuit associated with whichever one of the contacts $A_3$ to $F_3$ is closed. During the charging of the capacitor $U_2$, the voltage on the priming electrode V of a cold cathode trigger tube $T_3$ passes through the trigger ignition voltage and the tube fires. This energises a relay H to close contacts $H_1$ and $H_2$, and open contacts $H_3$. Closing of contacts $H_1$ allows the capacitor $U_2$ to discharge whilst closing of contacts $H_2$ locks on relay H and quenches the tube $T_3$. Opening of the contacts $H_3$ de-energises the relay G so opening the contacts $G_1$, $G_2$, $G_3$, $G_4$ as well as closing contacts $G_5$ and momentarily closing mercury contacts $G_6$. Although the contacts $G_4$ are opened, a capacitor $U_3$ momentarily holds on the relay H whilst this capacitor $U_3$ discharges via H, $H_2$; this is to safeguard against the tube $T_3$ refiring. The network containing the timing circuits, the relays H and G, and the contacts they actuate comprises said control means for controlling the heating device.

Figure 4:
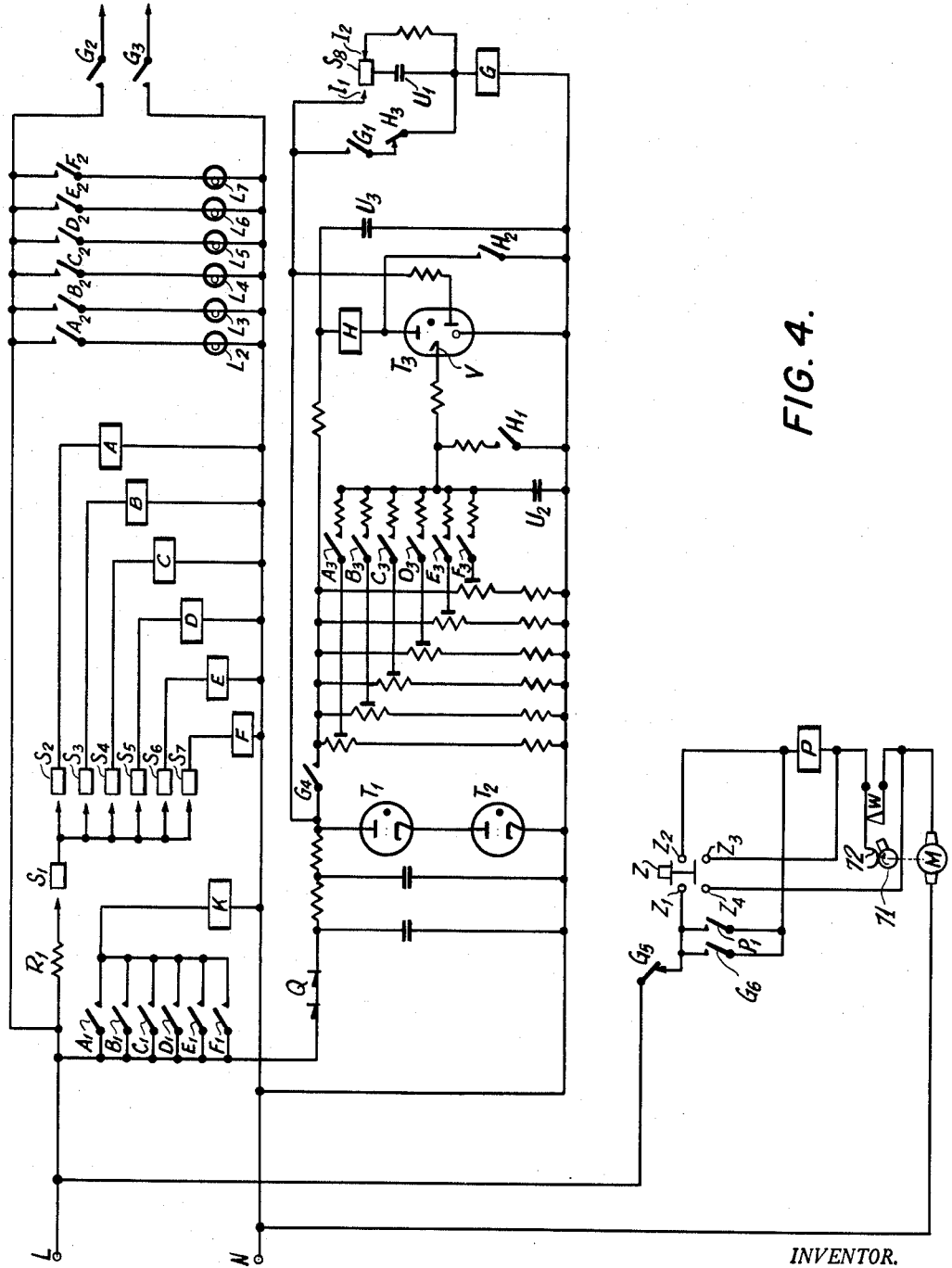
FIGURE 4 is an electrical circuit of the machine.

The network at the bottom of FIGURE 4 is for controlling the motor M which drives the cam shaft 36 (see FIGURES 1 and 2). The motor M is in series with a relay P, which operates contacts $P_1$, and cam actuated contacts W. A cam 71 (not shown in FIGURES 1 and 2) mounted on the cam shaft 36 lifts a cam follower 72 to open the contacts W once each revolution of the cam shaft 36, this occurring at the end of a cycle of the apparatus. To commence a new cycle of the apparatus, a starter button Z is pressed. If the contacts W are open, then the motor M is energised through the circuit $Z_1$, $Z_2$, P, $Z_3$, $Z_4$. Immediately the motor M turns, the cam 71 will turn so closing the contacts W. Since the relay P is now energised, the contacts $P_1$ close and the relay P is held on. The starter button Z can now be released and the motor will continue rotating, only stopping when either the contacts $G_5$ or W are opened. If when the starter button Z is pressed, the contacts W are closed, then the motor is energised through the relay P and contacts W, the contacts $P_1$ closing to hold on the relay P.

The operation of the whole apparatus will now be summarised.

When the apparatus is ready to commence a cycle, the movable parts of the apparatus are in the position shown in FIGURE 2, except that the cam shaft 36 is turned back a few degrees clockwise so that the cam follower 49 is on the high part 50 with all the arms 44 in their upper position so holding all the micro-switches $S_1$ to $S_7$ open. Also, the cam 71 is either holding the contacts W open or has just allowed them to shut, as in FIGURE 4. All the relay contacts are in the position shown in FIGURE 4. An operator places a container 1 on the platform 13 between the guides 14 and pushes the container into the locating tray 12 until the container contacts the back wall of the tray 12. The flange having a hole in position 4 and another hole in any one of the positions 5 to 10, say for example 5, is located in the groove 41 with the hole 4 below the arm end 45 of the micro-switch $S_1$ and the hole 5 below the arm end 45 of the micro-switch $S_7$. The operator presses the starter button Z and the motor commences to drive the cam shaft 36 and the belts 28 anti-clockwise and clockwise respectively in FIGURE 2. The lever 46 drops allowing the arms 44 of the micro-switches $S_1$, $S_7$ to engage the holes 4, 5 and drop into positions 53 so closing the micro-switches $S_1$, $S_7$. This energises the relay F which in turn energises the relay K, lights the lamp $L_7$, and closes the contacts $F_3$ so presetting the heating time of the microwave oven. If the relay K is not energised at this point, the apparatus stops and is reset to the beginning of a cycle. Thus, unless there is a correct combination of holes correctly associated with the sensing device, the apparatus will not continue past this point. Further rotation of the cam shaft 36 reciprocates the guillotine to cut off the part of the flange in the groove 41 and also to pierce the top of the container 1 to allow steam to escape during the subsequent heating. Further rotation of the cam shaft 36 brings the bar 38 into engagement with the flap 39 to transport the container into the microwave oven to position 1', whereupon the lower part of the frame 15 actuates the micro-switch $S_8$ to actuate the relay G. The contacts $G_5$ open to stop the motor M, the contacts $G_2$, $G_3$ close to switch on the microwave oven, and the contacts $G_4$ close to commence the timing of the oven. At the end of the pre-set time, the relay G is de-energised so opening the contacts $G_2$, $G_3$ to switch off the oven. The contacts $G_5$ are closed and the mercury contacts $G_6$ are momentarily closed so energising the relay P to actuate the contacts $P_1$ to hold on the relay P and restart the motor. The bar 38 moves into engagement with the flap 40 and transports the container 1 out of the oven. Just after the commencement of the return movement of the container 1, the cam follower 49 engages the high part 50 of the cam 51 to raise the lever 46 and return the arms in positions 53 to their upper positions, so opening the micro-switches $S_1$, $S_7$. The cam 69 then actuates the arms 65 to eject the cut off part of the flange from the groove 41. The motor M continues to move the container 1 until it returns to the position shown in FIGURES 1 and 2, whereupon the cam 71 opens the contact W to stop the motor M. The operator can then remove the container 1 containing the heated food and the apparatus is ready to receive the next container.

What is claimed is:

1. In apparatus for heating a foodstuff contained in a container having as an integral part thereof a flange with a first side and a second side opposite said first side and at least one hole preformed therein from said first side to said second side in a position corresponding to a desired extent of heating of said foodstuff, the improvement comprising a microwave oven for heating said foodstuff, control means connected to said microwave oven for controlling the extent of heating of said foodstuff by said microwave oven, a plurality of sensing arms associated with said control means and movable along a sensing-arms path into a sensing position in contact with said first side for sensing said flange forming an integral part of said container and an out-of-sensing position, means for guiding said flange substantially in a straight line along a flange path forming an angle with said sensing-arms path and into position to be sensed by said sensing arms, means for maintaining said sensing arms in an out-of-sensing position during guiding of said flange into position to be sensed by said sensing arms and for moving said sensing arms into sensing position following guiding of said flange into position to be sensed by said sensing arms, a selected one of said sensing arms in said sensing position passing through said hole, the selection of said selected one of said sensing arms being a function of the position of said hole, a switch mounted adjacent to said flange on the second side thereof and adapted to be actuated by said sensing arm passing through said hole to establish a setting of said control means corresponding to the desired extent of heating of said foodstuffs, cutting means adapted to sever said flange from said container, lever means adapted to move said cutting means between cutting and non-cutting states, and cam means for actuating said lever means to maintain said cutting means in said non-cutting state prior to movement of said sensing arms into said sensing position and to move said cutting means into said cutting state to sever said flange from said container subsequently to movement of said sensing arms into said sensing position, said foodstuff being heated by said heating device in accordance with the response of said sensing arms to said flange and a second heating of said foodstuff by said heating device being prevented.

2. In apparatus for heating an object contained in a container having as an integral part thereof preset indexing means having a setting independent of the exterior dimensions of said container and corresponding to a desired extent of heating of said object, the improvement comprising a high-frequency heating device, control means connected to said heating device for controlling the extent of heating of said object by said heating device, sensing means connected to said control means and movable between an out-of-sensing state in which it fails to sense said indexing means and a sensing state in which it is responsive to said preset indexing means forming an integral part of said container for setting said control means independently of the exterior dimensions of said container, means connected to said sensing means for bringing said sensing means into co-operation with said indexing means, cutting means adapted to sever said indexing means from said container, lever means adapted to move said cutting means between cutting and non-cutting states, and cam means for actuating said lever means to maintain said cutting means in said non-cutting state prior to movement of said sensing means into said sensing state and to move said cutting means into said cutting state to sever said indexing means from said container subsequently to movement of said sensing means into said sensing state, said object being heated by said heating device in accordance with the response of said sensing means to said indexing means and a second heating of said object by said heating device being prevented.

References Cited by the Examiner

UNITED STATES PATENTS

| | | | |
|---|---|---|---|
| 2,111,154 | 3/1938 | Nichols | 235—61.115 |
| 2,272,411 | 2/1942 | Johnson | 235—61.113 |
| 2,467,230 | 4/1949 | Revercomb et al. | 219—10.55 |
| 2,475,307 | 7/1949 | Brand et al. | 235—61.113 |
| 2,573,405 | 10/1951 | Clark | 235—61.12 |
| 2,583,338 | 1/1952 | Morse et al. | 219—10.55 |
| 2,725,101 | 11/1955 | Von Hofe | 83—278 X |
| 2,757,781 | 8/1956 | Freeman | 198—38 |
| 2,758,698 | 8/1956 | Freeman | 198—38 |
| 2,798,586 | 7/1957 | Freeman | 198—38 |
| 2,965,015 | 12/1960 | Huchok | 99—327 |
| 3,031,558 | 4/1962 | Euler | 219—43 X |

ROBERT E. PULFREY, *Primary Examiner.*

MAX L. LEVY, RICHARD M. WOOD, JEROME SCHNALL, *Examiners.*